SELECTIVE ANSWERING AND COMMANDING TELEPHONE CIRCUIT
Filed May 18, 1962
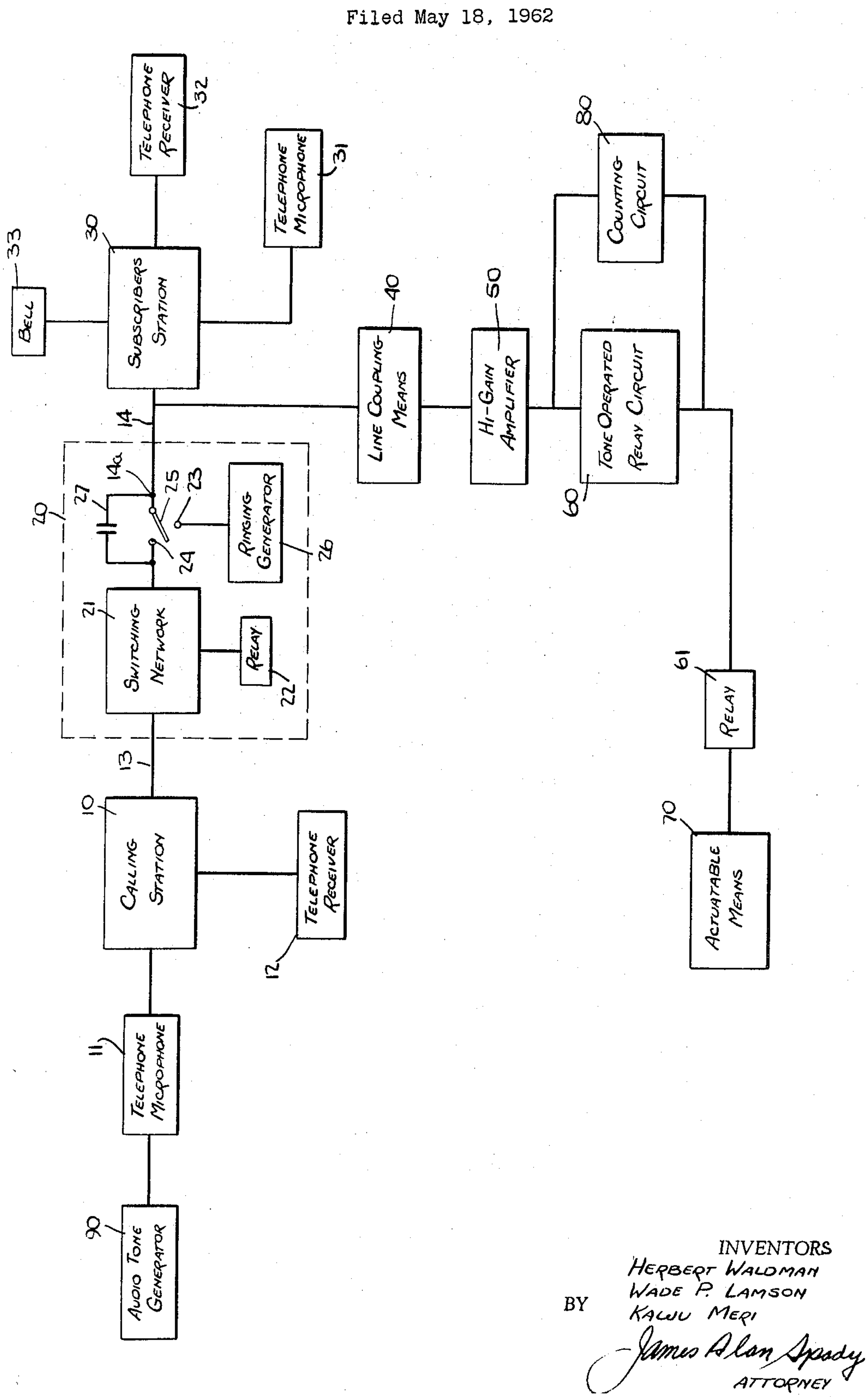
INVENTORS
HERBERT WALDMAN
WADE P. LAMSON
KALJU MERI
BY
James Alan Spady
ATTORNEY United States Patent Office
3,308,239
Patented Mar. 7, 1967

3,308,239
SELECTIVE ANSWERING AND COMMANDING TELEPHONE CIRCUIT

Herbert Waldman, Brooklyn, Wade P. Lamson, Lawrence, and Kalju Meri, Elmhurst, N.Y., assignors, by mesne assignments, to Royal Business Funds Corporation, New York, N.Y., a corporation of New York Filed May 18, 1962, Ser. No. 195,706
5 Claims. (Cl. 179—2)

This invention relates to telephone circuits, and more particularly relates to circuits for enabling selective remote answering and/or remote commanding via telephone lines and equipment.

There are many occasions upon which a need is felt for means to cause the remote self answering of a certain telephone subscribers station. There are many other occasions where there is no need to cause remote answering, but there is need to command a remote function at the certain station.

For example, remote answering of the certain station could be to record a message there, to receive a message therefrom, or to enable any other of the well known functions of a telephone recording and playback machine to come into play. Remote commanding, on the other hand, does not necessarily contemplate remote answering, but instead answers a need for stopping or starting any local means, such for example as a household appliance, an air conditioner, garage doors, and the like.

In order for a remote answering and/or commanding circuit to be practical, it must be selective in the sense that it must respond only to certain callers. These callers must be able to identify themselves by doing a certain thing involving knowledge on their part of what the circuit will distinguish them from all other callers by responding to.

Telephone answering machines have heretofore been known that respond to all callers by answering the phone, but respond beyond that only upon certain coding by the caller. Thus for example, after such a machine nonselectively answers the phone, it may play back all previously recorded messages provided the caller knows how to code it to do so.

But such machines are not selective in the answering itself. They must answer the phone before any selectivity can be exercised. Clearly there is, for many applications, great advantage in discriminating before answering rather then after. Additionally, remote commanding does not in most instances require telephone answering to carry out its ends.

It is accordingly a principal object of the present invention to provide a telephone circuit adapted to cause answering and/or commanding at the subscribers statiton in response to selected callers.

Another object of the invention is to provide such a circuit for use with a telephone recording and playback machine.

Still another object of the invention is to provide greater flexibility of use for telephone recording and playback machines by giving only selected callers access to the machine.

Still another object of the invention is to provide such a circuit whereby discrimination between callers may be made before answering rather than after, so that all but selected callers receive no response from their calling.

These and further objects and advantages of the invention will be more fully understood upon examination of the detailed description hereinbelow of one presently preferred but merely illustrative embodiment of the invention, when taken with the appended claims and the drawing, wherein:

The figure is a block diagram of a telephone circuit according to the present invention.

Referring now, to the drawing, a calling station 10 has a microphone 11 and a telephone receiver 12 and connects via line 13 with a switching network 21 in a central office indicated generally within dashed lines at 20. As is well known in the telephone art, switching network 21 can connect calling station 10 via a line such as 14 with any of a plurality of subscriber stations, but only a single subscriber station 30 is shown in the figure. Station 30 has a microphone 31 and a telephone receiver 32, and a local bell 33.

Central office 20 also includes a relay 22 having contacts 23 and 24 and controlling a bar 25 which normally rides at null between contacts 23 and 24 as shown in the figure. Contact 24 is connected to switching network 21, contact 23 is connected to signal generator 26, and bar 25 is connected to subscriber station 30. Signal generator 26 porduces a varying signal, that is, an alternating current signal. Capacitor 27 bridges switching network 21 and subscribers station 30 across contact 24 and bar 25. These several means are well-known and in general use in the telephone art.

Line coupling means 40 is connected into line 14 preferably at subscriber station 30. One example of such means 40 would be a line transformer, and other equivalent devices are known to the art. Means 40 is responsive to the presence of audio signals in line 14, and feeds the input to his gain amplifier 50, which may be any well known high gain audio amplifier. The output of amplifier 50 is fed to tone operated relay circuit 60. Circuit 60 may be any tuned circuit known to the art that will respond to the imposition of an audio signal within its tuned frequency by actuating relay 61.

Actuatable means 70 may be a local appliance switch, a buzzer switch, light switch, or the like. Thus any local function can be switched on or off by the relay 61, and an actuatable means 70 of this nature is adapted to the aforesaid remote command function of the inventive circuit. Actuatable means 70 may also be the telephone cradle switch itself, or its equivalent in the answering circuit, so that actuation of relay 61 causes answering of the call at station 30. Another important mode of operation is where means 70 is both an answering switch and a local function means, both of which are actuated by relay 61. For example, this could be the cradle switch for answering and a local tape recorder for taking the callers dictation over line 14. These functions will be more fully discussed below in connection with the opeartion of the present apparatus.

In operation, the arrangement according to the present invention functions as follows. Calling station 10 calls subscriber station 30 by dialing the number thereof, or by other means known to the art. In any case, switching network 21 finds line 14 and subscriber station 30 by well-known means, and actuates relay 22. Bar 25 controlled thereby is pulled-in from the null position shown in the figure to the position connecting signal generator 26 via contact 23 to line 14 and hence to station 30 where bell 33 rings.

The current produced by generator 26 flows through contact 23 and bar 25 and to line 14 where it divides at point 14A, one portion continuing on to ring bell 33 as aforesaid, and a second portion being transmitted across capacitor 27 and thence via line 13 to station 10 and telephone receiver 12. The generator 26 thus simultaneously sends signals to bell 33 in the subscribers station and telephone receiver 12 in the calling station. The calling party is thus aware of each bell-ring of bell 33 as it occurs.

Tone operated relay circuit 60 is tuned to a single audio frequency as aforesaid. The calling party either is, or is not, aware of this fact. If the calling party is one whom it is desired to allow to cause remote answering and/or commanding at station 30, the party will know the frequency to which circuit 60 is tuned and will possess an air whistle 90 or other device capable of producing an audio signal of that precise frequency.

Each time a ring of bell 33 is completed, relay 22 pulls bar 25 away from contact 23 thus causing termination of that ring. As aforesaid the calling party is thereby made aware that bar 25 has returned to the null position shown, that is, away from contact 23. He will be made aware of this fact by the absence of a ringing signal in his telephone receiver 12. He then blows his whistle, or otherwise audibly produces a tone signal of the proper frequency at microphone 11. This tone sets up an alternating signal in line 13 which travels across capacitor 27 and through line 14.

Line coupling means 40 senses this signal in line 14, and amplified by amplifier 50, the signal is imposed on tone operated relay circuit 60. If the tone signal in line 14 corresponds to the pre-set tuning of circuit 60, the present device may be set so as to thereupon actuate relay 61 and thereby actuatable means 70, without further encoding. However it may be useful, in order to further insure selectivity of response to only predetermined callers, to further code the call to identify the caller as one authorized to actuate means 70.

One mode of such further coding is to provide a counting circuit 80, one example of which is a staircase counter having at least two counting sections. One section counts the number of ringing signals sent through line 14 and another section counts the number of proper tone signals received in line 14. Relay 61 is thereby actuated only when the sequence of ringing signals and tone signals come in the proper number and/or order. It is apparent that such coding allows much greater protection against intermeddlers than response to a single tone signal without a counting circuit such as 80.

In any event, when relay 61 is actuated, it controls actuatable means 70. When an air conditioner or other local appliance is to be turned on, means 70 will simply be a switch. Other possibilities will be apparent to those skilled in the art. When it is desired to have station 30 answered, means 70 will disengage the cradle switch thus answering the phone for any desired purpose, such as bringing a telephone recording and playback machine into play. When the cradle switch is lifted, relay 22 pulls bar 25 from the null position shown to contact with contact 24 thus completing the audio speech circuit for telephone speech. A second means of a command nature may be subsumed under means 70 when the answering function just described is employed. In that case for example, a dictating machine may be commanded to turn on by means 70 at the same time that station 30 is answered thereby. Other possibilities will be apparent to those skilled in the art.

It will be apparent that with this system, the owner of the premises containing station 30 need only select his tone for circuit 60, and set counting circuit 80, if employed, for the coding pattern desired. Then when away from station 30, he can still command functions there. This can be a convenience over prior systems when long distance travelling, such as by airplane overnight and the like, is contemplated. He may also desire to have station 30 answer for any of the aforesaid recording and/or playback machine purposes, or other purposes. He may further authorize certain persons to perform these functions for him, by supplying them with the appropriate whistle and coding instructions.

It will be understood that the whistle or other tone means is preferably employed only between ringing signals as indicated by telephone receiver 12. Coding of the call is thus quite simple to effectuate, no matter how complicated a pattern or ringing signals, tone signals, and absence of tone signals, is employed.

In addition to the aforesaid highly advantageous attributes of the present invention, the system also makes possible the appraisal of the identity of the caller when the party of subscriber 30 is actually there. Thus if a person does not want to be disturbed except by important calls, or wants to be "out" to all but certain callers, the present system can be set as aforesaid, and proper whistles issued to preferred callers. Means 70 will then be a buzzer or the like. A light or other unobtrusive device may be substituted for bell 33, preserving an option to answer even unauthorized calls. However when an authorized or preferred call comes in, it will actuate means 70 here a buzzer) thus appraising the subscriber that a preferred call is on the line. To all others the subscriber would be "out."

Although a specific embodiment of the invention has been described as required by law, the invention is not to be construed as limited thereto. The invention is of general utility with any form of telephone system employing any form of central office circuitry. That shown herein, particularly in embodying a capacitor 27 as means bridging switch 23–24–25, is the most prevalent arrangement. However, it should be understood that other embodiments of such bridging means may be employed, so long as such means pass alternating current as already explained. It has already been stated that it is preferred to produce the audio or tone signal at the microphone of the calling station only between ringing signals. It is also possible to superimpose the tone signal on the ringing signal through capacitor 27 or its equivalent. While such operation is possible with favorable voltage ratios, and is included within the scope of the appended claims, it is nevertheless not the preferred mode. It should be further understood that the term "recording and playback apparatus" as used hereinabove contemplates either apparatus singly or the combined apparatus.

It is also contemplated that counting circuit 80 described above may alternatively be employed to allow selective actuation of any or any combination of a plurality of separate actuatable means 70 at subscribers station 30 or elsewhere. Thus several appliances for example, could be arranged so that certain tone patterns (either by number or otherwise as aforesaid) could actuate certain of a plurality of said appliances. The proper caller can thus pick the means 70 he will actuate. It will be apparent that this could also be accomplished by employing a plurality of tones, one for each actuatable means, with a corresponding multiplication of responsive means. All variations on the embodiment shown are contemplated and claimed in the appended claims, as will be apparent to those skilled in the art.

What is claimed is:

1. In a telephone system wherein a central office has variable current conductive bridging means bridging an open speech circuit and wherein a calling station including a microphone signals a subscriber by means of a ringing tone occurring at intervals during a ringing connection while a speech circuit is open and before it is completed, the method of signalling from a calling station to a subscribers station during the ringing connection and before the subscriber has answered and completed the speech circuit which comprises feeding a variable current signal to the microphone of the calling station during at least some of the intervals between successive rings and utilizing said variable current signal to perform a function at the subscriber's station.

2. The method according to claim 1 wherein the ringing tone and the variable current signal are separated at the subscriber's station and fed to different electrical circuits.

3. A method for identifying a telephone caller from a calling station including a microphone before the subscribers station has answered and completed the speech circuit of a telephone system wherein a central office has alternating current conductive bridging means bridging an open speech circuit at all times, said method comprising causing a ringing connection between said stations, causing a tone of a frequency within the audio band pass of the telephone system and feeding said tone into the microphone of the calling station during intervals between successive rings and feeding said tone to a selective frequency responsive device and utilizing the response of said frequency responsive device to identify the caller.

4. A method for remotely causing the self answering of a telephone circuit or commanding a function at a subscribers station from a calling station including a microphone during the period of transmission of ringing signal at intervals wherein a telephone central office is provided with alternating current conductive bridging means bridging an open speech circuit at all times, said method comprising causing a ringing connection between said stations, initiating a tone of a frequency within the audio band pass of the telephone circuit, and feeding said tone into the microphone of said calling station during the intervals between successive rings and utilizing said tones received at said subscribers station during said intervals to cause said telephone to be answered or to command a function or both.

5. A method for actuating a telephone recording or playback device at a telephone subscribers station of a telephone circuit from a calling station including a microphone before the subscribers station has answered completing a speech circuit and wherein a central office has alternating current conductive bridging means bridging the speech circuit at all times, said method comprising causing a ringing connection between said stations, initiating a tone of a frequency within the audio band pass of the telephone circuit and feeding said tone into the microphone of said calling station during intervals between successive rings and utilizing said tone received at said subscribers station during said intervals to actuate a telephone recording or playback device.

References Cited by the Examiner

UNITED STATES PATENTS

| | | | |
|---|---|---|---|
| 1,951,159 | 3/1934 | Lubberger | 179—16 |
| 2,516,361 | 7/1950 | Barker | 179—2 |
| 2,568,342 | 9/1951 | Koehler | 179—2 |
| 3,061,783 | 10/1962 | Noller | 179—2 |
| 3,142,726 | 7/1964 | Brothman | 179—2 |

DAVID G. REDINBAUGH, *Primary Examiner.*

E. C. MULCAHY, Jr., S. J. GLASSMAN, *Assistant Examiners.*